M. GUMBERT.
HEAT INSULATING VESSEL.
APPLICATION FILED SEPT. 18, 1908.
929,422.
Patented July 27, 1909.
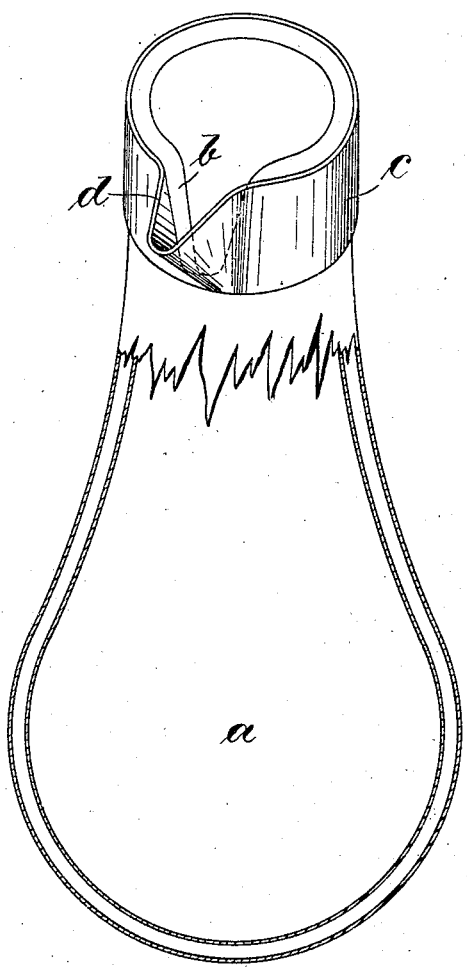
Witnesses:
Flora Greenwald
James H. Griggs
Inventor:
Max Gumbert.
by L. K. Böhm,
Attorney.

UNITED STATES PATENT OFFICE.

MAX GUMBERT, OF BERLIN, GERMANY, ASSIGNOR TO "ISOLA," GESELLSCHAFT FÜR WÄRME & KÄLTE ISOLIERUNG M. B. H., OF BERLIN, GERMANY.

HEAT-INSULATING VESSEL.

No. 929,422.

Specification of Letters Patent.

Patented July 27, 1909.

Application filed September 18, 1908. Serial No. 453,699.

*To all whom it may concern:*

Be it known that I, MAX GUMBERT, a subject of the King of Prussia, German Emperor, and resident of 44 Elisabethufer, Berlin, Germany, have invented certain new and useful Improvements in Heat-Insulating Vessels, of which the following is a specification.

This invention relates to heat insulating vessels of the Dewar type *i. e.* those in which a double walling is employed with an evacuated space between the walls.

The object of the present invention is to provide such vessels with a spout arrangement for facilitating pouring out of the contents of the vessel.

The invention is illustrated in perspective view, partly in section in one convenient form in the accompanying drawing.

The bottle shaped vessel $a$ which is constructed with double walls having an evacuated space between said walls is at its upper edge provided with a V- or like shaped notch $b$. This notch is located at the part where the two glass or like walls of the vessel are fused or joined together. Around the neck of the bottle in the form illustrated there is arranged a protecting band $c$ having a beak shaped spout $d$ arranged coinciding with the V-shaped notch $b$.

In the form shown the protective cover extends only around the neck but it will be readily understood that this cover may be formed in any convenient manner to extend over a greater or lesser part of the surface of the vessel $a$ as desired and may be provided with suitable carrying or supporting means as desired.

I claim:

1. In a heat insulated vessel, comprising a receptacle part having double walls, coinciding notches in the top edges of each of such walls, said walls being fused together around the top edge and the notches and a vacuum between the walls and a protecting band around the top and exterior part of said vessel and having a spout coinciding with said notch in the receptacle.

2. In a heat insulated vessel, comprising a receptacle part having double walls, coinciding notches in the top edges of each of such walls, said walls being fused together around the top edge and the notches and a vacuum between the walls and a protecting metallic band around the top and exterior part of said vessel and having a spout coinciding with said notch in the receptacle.

3. In a heat insulated vessel, comprising a receptacle part having double walls of glass, coinciding notches in the top edges of each of such walls, said walls being fused together around the top edge and the notches and a vacuum between the walls and a protecting metallic band around the top and exterior part of said vessel and having a spout coinciding with said notch in the receptacle.

In witness whereof I have hereunto set my hand in the presence of two witnesses.

MAX GUMBERT.

Witnesses:
  HENRY HASPER,
  WOLDEMAR HAUPT.